United States Patent [19]
Seppanen et al.

[11] Patent Number: 6,006,114
[45] Date of Patent: Dec. 21, 1999

[54] RADIOTELEPHONE ENABLING ADJUSTMENT OF ALERTING INDICATOR VOLUME/LEVEL DURING INCOMING CALLS

[75] Inventors: Jorma Seppanen, Oulu; Juha Vaihoja, Tupos; Mikko Lietsalmi; Jaakko Vanttila, both of Oulu, all of Finland

[73] Assignee: Nokia Mobiles Phones Limited, Salo, Finland

[21] Appl. No.: 08/554,277

[22] Filed: Nov. 6, 1995

[51] Int. Cl.$^6$ .............................. H04M 1/00; H04Q 7/32
[52] U.S. Cl. ............................................. 455/567; 379/373
[58] Field of Search ..................... 379/58, 59, 418, 379/421, 445, 390, 355, 252, 253, 373, 376, 375, 164, 395; 455/567

[56] References Cited

U.S. PATENT DOCUMENTS

| | | | |
|---|---|---|---|
| 4,650,931 | 3/1987 | Tsukada | 455/462 |
| 4,788,713 | 11/1988 | Hashimoto | 379/68 |
| 4,982,424 | 1/1991 | Saito | 379/376 |
| 5,191,607 | 3/1993 | Meyers | 379/375 |
| 5,241,583 | 8/1993 | Martensson | 455/565 |
| 5,303,284 | 4/1994 | Shinozaki | 455/567 |
| 5,313,523 | 5/1994 | Kawauchi | 379/395 |
| 5,392,338 | 2/1995 | Danish | 379/355 |
| 5,448,620 | 9/1995 | Gershkovich | 455/552 |
| 5,491,745 | 2/1996 | Roeder | 379/355 |
| 5,657,372 | 8/1997 | Ahlberg | 455/567 |

FOREIGN PATENT DOCUMENTS

| | | |
|---|---|---|
| 0 277 031 A2 | 8/1988 | European Pat. Off. . |
| 0 440 473 A2 | 8/1991 | European Pat. Off. . |
| 2 135 841 | 9/1984 | United Kingdom . |
| 2135841 | 9/1984 | United Kingdom ............. H03G 3/00 |
| 2 243 117 | 10/1991 | United Kingdom . |
| WO 91/12682 | 8/1991 | WIPO . |

OTHER PUBLICATIONS

PN301 1–2, Apr. 8, 1994, pp. 150–152, 156, 157, 164–168, 175.

*Primary Examiner*—Dwayne D. Bost
*Assistant Examiner*—Myron K. Wyche
*Attorney, Agent, or Firm*—Perman & Green, LLP

[57] ABSTRACT

This invention pertains to a method for varying the level of an alerting indicator of a radiotelephone while an incoming call is being received, and also to a radiotelephone that operates in accordance with the method. The method includes a first step of operating a user interface (22) for inputting information to a controller (20) of the radiotelephone, the information specifying that an alerting indicator volume be reduced or muted. In response to the inputted information, a second step reduces the alerting indicator volume. An alerting indicator volume that has been reduced is increased upon the termination of the incoming call signal, upon the elapse of a predetermined time period and/or in response to information inputted to the controller (20) via the user interface (22), which information specifies that the alerting indicator volume be increased. In one embodiment of the invention, the alerting indicator volume is maintained at a reduced value until information is input to the controller (20) via operation of the user interface (22), which information specifies that the alerting indicator volume be increased. In response to the inputted information, the alerting indicator volume is increased. The invention may be used in radiotelephones employing non-audio alerting indicator devices for indicating an incoming call, such as vibrating devices.

16 Claims, 3 Drawing Sheets

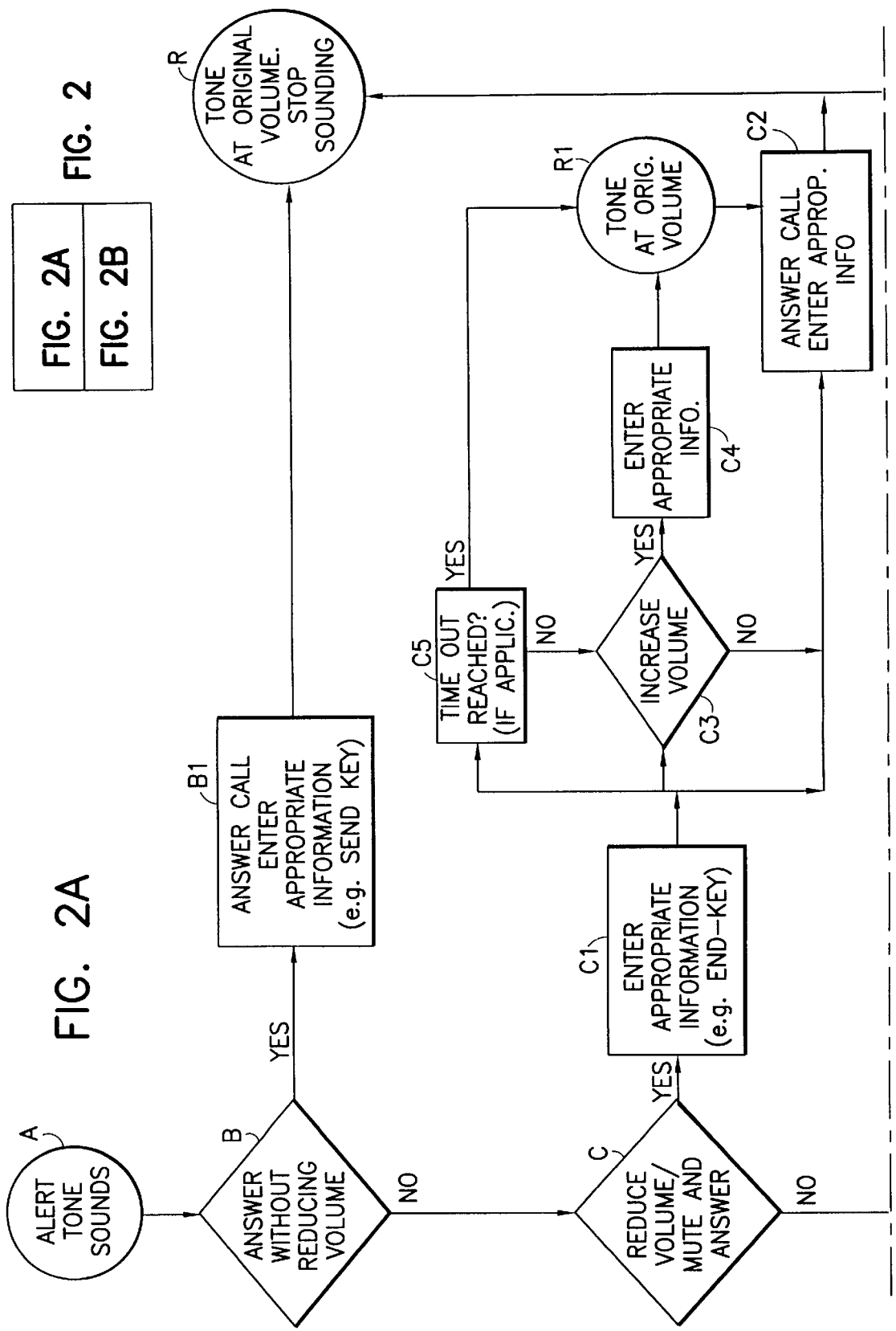

RADIOTELEPHONE ENABLING ADJUSTMENT OF ALERTING INDICATOR VOLUME/LEVEL DURING INCOMING CALLS

FIELD OF THE INVENTION

This invention relates generally to radiotelephone receivers and, in particular, to radiotelephones having an alerting indicator with an adjustable volume or level.

BACKGROUND OF THE INVENTION

It is known in the art to provide a radiotelephone with an adjustable alert tone volume, as evidenced by Nokia Mobile Phones owner's manuals N201 and 232. The alert tone is analogous to the ringing of a conventional telephone, and notifies the user of a reception of an incoming call. Such radiotelephones, however, permit a user to select an alert tone volume only during the time when no incoming call is being received by the radiotelephone. For current radiotelephones, in order to quiet an alert tone during the reception of an incoming call a user must either answer and thereafter terminate the call by depressing appropriate keys of a user keypad, or simply turn off the radiotelephone power. These methods, however, are inadequate for a user who does not wish to terminate the call, but desires to either answer the call later, or have the call diverted to a message storage system or other telephone number. To circumvent these problems, some radiotelephones have been provided with a silent service facility, which may include visible alerts such as a flashing LED or display. However, unless the user is viewing the phone, an incoming call may be missed.

SUMMARY OF THE INVENTION

It is an object of this invention to provide a radiotelephone having an alerting indicator volume or level that is capable of being adjusted by a user while an incoming call is being received, that is, while the alerting indicator is being generated.

The foregoing and other problems are overcome and the object of the invention is realized by methods for varying the volume or level of an alerting indicator of a radiotelephone while an incoming call is being received, and by a radiotelephone that operates in accordance with the method. The method includes a first step of operating a user interface for inputting information to a controller of the radiotelephone, the information specifying that the alerting indicator volume be reduced. In response to the inputted information, a second step reduces the alerting indicator volume accordingly.

Further in accordance with the method of this invention, where the inputted information specifies that the volume of the alerting indicator be muted, the alerting indicator volume is muted in response to the inputted information.

Further in accordance with the method of this invention the step of operating includes a step of inputting information to a controller via a keypad having a plurality of keys. In response to the inputted information the alerting indicator volume is reduced by an amount which is a function of the amount of time for which at least one of the plurality of keys is depressed.

Further in accordance with the method of this invention the step of operating includes a step of inputting information to a controller via at least one unlocked key of a keypad.

Further in accordance with the method of this invention the step of operating includes a step of inputting information to a controller via a keypad having a plurality of keys. In response to the inputted information the alerting indicator volume is reduced by a predetermined amount for each depression of at least one of the plurality of keys.

The method further includes a step of increasing the alerting indicator upon the termination of an incoming call signal, upon the elapse of a predetermined time period, and/or in response to information inputted to the controller via the keypad user interface, which information specifies that the alerting indicator volume be increased.

The method further includes a step of maintaining the alerting indicator at a reduced volume for subsequent incoming calls until information is input to the controller via operation of the user interface, which information specifies that the alerting indicator volume be increased. In response to the inputted information the alerting indicator volume is increased.

The invention may also be used in radiotelephones employing non-audio alerting indicators, such as, for example, vibrating devices.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

This invention is described in the context of a radiotelephone or mobile terminal that operates in accordance with an analog (FM) mode, and/or a Time Division Multiple Access (TDMA) digital mode of operation. The teaching of this invention may also be employed in a radiotelephone that operates with spread spectrum (SS) and Code Division Multiple Access (CDMA) techniques, such as that described in the IS-95 Interim Standard. That is, the teaching of this invention can be applied to a wide variety of radiotelephones, and to user communication devices in general, that employ an alerting device to alert a user of an incoming call or message. It should be realized that although the invention is hereinbelow described in the context of a radiotelephone that employs an audio alerting indicator (also referred to hereinafter as an "alert tone" or an "audible tone") that is made audible via a loudspeaker 6, the invention is not limited as such. The teaching of this invention can be applied to radiotelephones and to user communication systems that employ any suitable device (e.g., a buzzer or a vibrator) for alerting a user of an incoming call or message. In the context described hereinbelow, the generation of the alert tone is analogous to the ringing of a conventional telephone when an incoming call is being received.

Figure 1:
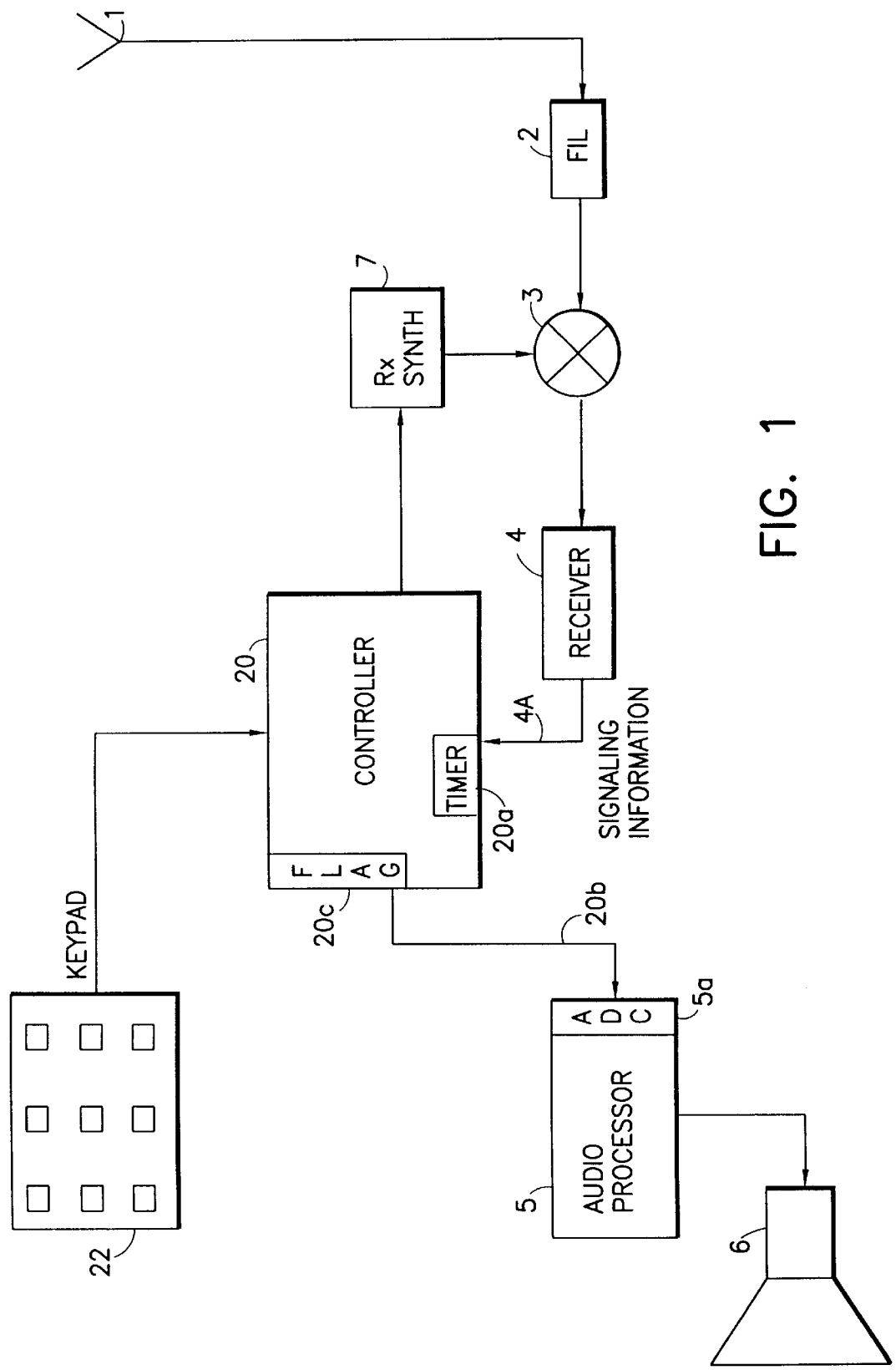
FIG. 1 is a block diagram of a receiver portion of a radiotelephone that is constructed and operated in accordance with this invention.

FIG. 1 illustrates a block diagram of an exemplary receiver portion of a mobile terminal (e.g., IS-136 compatible) that is constructed in accordance with the invention. An antenna 1 receives a signal from a base station (not illustrated) indicating an incoming call. The received signal, which has a center frequency of 885 MHz, is fed through a bandpass filter 2 to a mixer 3. The receiver's first local oscillator signal is generated with an RX-synthesizer 7 which is tuned above the received frequency by an amount equal to, by example, 45 Mhz. The receiver block 4 demodulates and processes the received signal. The controller 20 is able to communicate with the receiver block 4 via path 4a by receiving information which is extracted from the received signal by the receiver block 4. In response, the controller 20 sets a flag 20c to enable the generation of an audible tone which indicates an incoming call. The audible tone can be generated by programming, over a signalling path 20b, a digital to analog converter (ADC 5a) that forms a portion of an audio processor block 5. The required audio processing is accomplished digitally (using the ADC 5a) or in an analog manner, depending on the operating mode. The output of the audio processor block 5 drives, by example, a loudspeaker 6 whereby a user is enabled to hear a tone that indicates an occurrence of the incoming call.

The alerting indicator has a volume or level which may depend upon the amount of gain of at least one amplifier that forms a portion of the audio processor block 5. The amplifier gain may be varied in response to messages received from the controller 20.

The controller 20 comprises at least one microprocessor (MCU). The controller 20 manages the user interface via a keypad 22. The controller 20 has a timer 20a for measuring the amount of time which has elapsed from the time when the controller 20 first receives information signalling a particular incoming call from the receiver block 4.

For the purposes of this description, there may be various response options available to a user when an alerting indicator is sounded by the mobile terminal indicating an incoming call. Referring to the flow diagram illustrated in FIG. 2, these options may include: answering the incoming call without muting/reducing the alerting indicator volume (Block B); muting/reducing the alerting indicator volume before answering the incoming call (Block C); not answering the call but muting/reducing the alerting indicator volume (Block D); and not answering the call nor muting/reducing the alerting indicator volume (Block E). A user of the mobile terminal of FIG. 1 may employ the keypad 22 to enter information into the controller 20 as described further below, to choose the desired response option.

To implement the first response option (Block B), the user can simply enter information into the keypad 22 which enables the incoming call to be answered. This step is denoted by Block B1 in FIG. 2. The implementation of this option is not considered germane to this invention and is mentioned for completeness only. Any suitable method known in the art for answering an incoming call enabling the mobile terminal to output the sound of the caller's speech may be employed. Typically, the phone's SEND key is depressed to answer the call.

Block C identifies the second response option available to a user in response to an alerting indicator. This option may be implemented in alternate embodiments. Block C represents a case wherein the user decides to answer an incoming call after a desired time period has passed. Not wishing to hear the alerting indicator at its original volume during the time period, however, the user desires to reduce or mute the volume. There are alternate embodiments of the present invention, each representing one option available to the user. In one embodiment, the user may mute the alerting indicator; that is, reduce the volume to zero or substantially zero, thereby rendering the alerting indicator inaudible. In a second embodiment, the user may reduce the alerting indicator volume by a desired amount, without muting the alerting indicator. It should be noted, however, that both embodiments may be implemented in a single mobile terminal. Furthermore, it should be realized that muting the audible tone can be considered as a sub-set of reducing the volume, wherein the volume is reduced to zero.

To implement the first embodiment, the user enters information into the keypad 22 (step denoted as Block C1 in FIG. 2) which causes the controller 20 to set the flag 20c which in turn disables, or mutes, the alerting indicator being produced through the audio processor block 5 and the loudspeaker 6. Muting may be accomplished by the user depressing any of the keys of the keypad 22, or in the case where certain keypad keys are locked, by depressing any unlocked key (e.g., the END-key or the VOLUME-key). To mute the alerting indicator the controller 20 may simply program the ADC 5a with all zeros, or with a value that reduces the analog output of the ADC to zero or approximately zero.

In this regard the output of the ADC 5a may be used to control the gain of an audio path amplifier, or may be used as the source of the alerting indicator itself. In another embodiment an oscillator may be used to generate the alerting indicator, and the output of the ADC 5a may be used to control the gain of an amplifier fed by the oscillator, or to disable the oscillator. It should thus be realized that the exact manner in which the alerting indicator is generated and made audible or otherwise perceptible to the user is not of particular concern to the teaching of this invention. For example, the controller 20 may simply provide a logic level to the audio processor block, such as the output of the flag 20c, wherein the logic level disables logic circuits in the block 5 through which the alerting indicator signal passes.

To implement the second embodiment, the user may enter information into the keypad 22 which causes the controller 20 to set the flag 20c causing the audio processor block 5 to decrease the amplifier gain, thereby reducing the alerting indicator volume. The amount of gain, and hence volume, reduction is a function upon the information the user enters into the keyboard 22. In one embodiment, the gain decrement is a function of the length of time that the user depresses at least one of the appropriate keys of the keypad 22. In an alternate embodiment, the gain may be reduced by a predetermined amount each time a user makes a single depression of at least one of the keys of keypad 22. For either of these embodiments, the appropriate information entered by the user to reduce the alerting indicator volume or level is done by depressing at least one predetermined key of the keypad 22. As for the case of muting, where certain keys of the keypad 22 may be locked, volume reduction of the alerting indicator is accomplished by depressing at least one of the unlocked keys of the keypad 22. As in the muting case, the controller 20 can program the ADC 5a so as to provide a desired output level, or can accomplish the reduction in volume by any of a number of suitable techniques.

The user may decide to restore the alert tone to its original volume before answering the incoming call (Block C3). In one embodiment of this invention, denoted as Block C4 in FIG. 2, the user may restore the alert tone volume by depressing at least one appropriate key (e.g., the END-key) of the keypad 22 which causes the controller 20 to reset the previously set flag 20C. Resetting the flag 20C causes the gain of the block 5, and hence the alert tone volume, to subsequently return to their original values (Block $R_1$).

In another embodiment of this invention, the alert tone volume can be restored to its original value after a predetermined time period has elapsed from when the incoming call was first received. In this case the controller 20 sets the timer 20a to run when the controller 20 first receives information from the receiver block 4 representing the incoming call. When the timer 20a reaches a predetermined value (e.g., 30 seconds) and the incoming call signal is still being received, such occurrence, also denoted as Block C5 of FIG. 2, causes the controller 20 to reset the flag 20C. The gain of block 5 and the alerting tone volume return to their original values (Block $R_1$), as described above for the previously discussed embodiment.

As shown in Block C2, once the user desires to answer the incoming call, he can simply enter information into the keypad 22 which disables the alerting indicator and enables a voice to be heard over the loudspeaker 6 in the same manner as described above for the first response option. For the case wherein the user answers the incoming call before the alerting indicator volume is restored via one of the two previously discussed embodiments however, the information entered into the keypad 22, (entered by depressing, for example, the SEND-key of keypad 22) also causes the controller 20 to reset the previously set flag 20c. Resetting the flag 20c causes the gain of the block 5, and hence the alerting indicator volume, to subsequently return to their original values. In this manner, the muting, or reduction of the volume, may terminate automatically when the call is answered. Thus, an alerting indicator of a subsequent incoming call is sounded by the loudspeaker 6 at the initial volume as set by the initial gain of the audio processor block 5. The step of returning the alerting indicator volume to its original volume in this manner is denoted in FIG. 2 by Block R.

In some applications it may be desirable to maintain the alerting indicator at a reduced level for subsequent calls. One embodiment of the invention (not illustrated in FIG. 2) permits the user to maintain the alerting indicator at a reduced level. For this case, when the user answers an incoming call, (in the manner described above) the controller 20 is not caused to reset the previously set flag 20C. Thus, the gain of the block 5 and the alerting indicator volume remain at their reduced values for subsequent calls until the user intentionally enters information that causes the Flag 20 to be reset. Thereafter, the gain of the audio processing block 5 and the alerting indicator volume return to their original values.

Figure 2B:
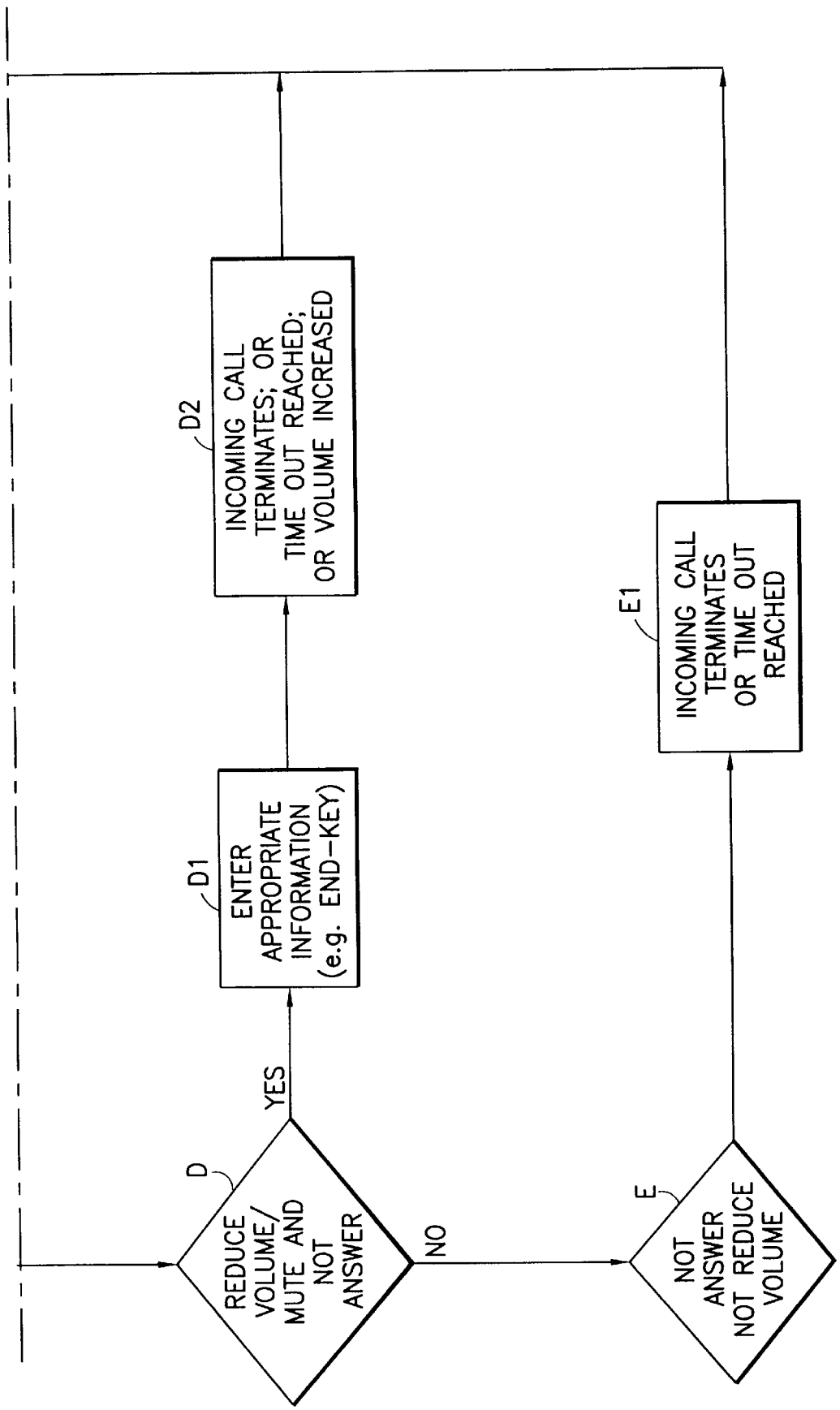
FIG. 2 is a logical flow diagram of a method in accordance with this invention.

As was previously stated, in the third response option, indicated as Block D in FIG. 2, the user may decide not to answer the incoming call while muting or reducing the original alerting indicator volume. The user may accomplish this by employing the same methods used for muting/reducing the alerting indicator volume as described in the foregoing discussion of the second response option (Block D1). However, since the call is not answered by the user, an additional method may be employed to return the alerting indicator volume to its original value, as discussed below for several alternate embodiments.

In a first embodiment, once the incoming call is terminated by the user or by the caller, the incoming call signal is no longer received by the mobile terminal antenna 1, and the receiver block 4 stops sending extracted signal information to the controller 20. When this occurs, the controller 20 may reset the flag 20c, which causes the gain of the audio processor block 5 to increase to its original value. This step is denoted as Block D2 in FIG. 2. As a result, the alerting indicator volume indicating a subsequent incoming call will be at its original volume (Block R).

The mobile terminal may have a capability of redirecting the incoming call to another telephone number or to a voice message storage system. In these cases the controller 20 sets the timer 20a to run when the controller 20 first receives information from the receiver block 4 representing the incoming call. When the timer 20a reaches a predetermined value (e.g., 30 seconds), and the incoming call signal is still being received, such occurrence, also denoted as Block D2 of FIG. 2, causes the controller 20 to reset the flag 20c. Resetting the flag 20c causes the gain of the audio processor block 5 to return to its initial value (Block R) in the same manner as described above for the second response option. Also, the incoming call can be simultaneously redirected to a desired destination in a manner known in the art.

The user may decide to restore the alert tone volume to its original value before the incoming call is terminated and/or before the timer 20a reaches the predetermined value. This user response, which is denoted as Blocks D3 and D4 of FIG. 2, is similar to the embodiment discussed above under the second response option for restoring the alert tone volume. As such, the alert tone volume may be restored by depressing at least one appropriate key of the keypad 22 (e.g., the END-key) which causes the controller to reset the flag 20C. Thereafter, the gain of block 5 and the alert tone volume return to their original values (Block R).

The fourth response option is denoted in FIG. 2 as Block E. As previously stated, this option represents a case where the user does not answer, mute, or reduce the volume of the alerting indicator signal of the incoming call. In this case, because no alerting indicator volume reduction/muting occurs, the controller 20 does not set the flag 20c to cause the volume reduction/muting, and the alerting indicator volume is maintained at the original volume during reception of the incoming call. The incoming call may be terminated by the user, by the caller, or redirected to a desired destination after the controller timer reaches the predetermined value (Block E1), as described above.

Although described in the context of certain keypad key depressions, it is to be understood that this description is exemplary of this invention. For example, in some cellular systems (e.g., GSM) depressing the END key during the generation of an incoming call alerting tone will terminate or reject the call. As such, another key is preferably selected for muting or reducing the volume of the alerting tone. For example, a menu soft key or a VOLUME-key can be used.

Furthermore, and as was described above, the teaching of this invention can be employed with any type of alerting device (e.g., loudspeaker, buzzer, vibrator, optical, etc.), wherein it is desired to reduce or eliminate the resulting user-perceptible alerting indication (e.g., audible, tactile, visual, etc.) during the receipt of an incoming call to a radiotelephone. Reducing the level of alerting device can encompass a reduction in volume, reduction in vibration, reduction in visual output, etc.

Thus, while the invention has been particularly shown and described with respect to preferred embodiments thereof, it will be understood by those skilled in the art that changes in form and details may be made therein without departing from the scope and spirit of the invention.

What is claimed is:

1. A method for decreasing the level of a user-perceptible alerting indicator of a radiotelephone, comprising the steps of:

receiving, at the radiotelephone, a signal indicating an incoming call;

in response to the radiotelephone receiving the signal indicating the incoming call, generating the alerting indicator to notify a user of the incoming call;

operating a user interface for inputting information to a controller of the radiotelephone, the information specifying that the level of the alerting indicator be reduced; and in response to the inputted information, variably reducing the level of the alerting indicator while the incoming call is being received by the radiotelephone.

2. A method as set forth in claim 1 wherein the inputted information specifies that a volume of the alerting indicator be muted, and wherein the alerting indicator volume is muted in response to the inputted information.

3. A method as set forth in claim 1 wherein the step of operating is performed by inputting the information into the controller via a keypad having a plurality of keys, and wherein in response to the inputted information the alerting indicator level is reduced by an amount which is a function of an amount of time for which at least one of the plurality of keys is depressed.

4. A method as set forth in claim 1 wherein the step of operating is performed by inputting the information into the controller via at least one unlocked key of a keypad.

5. A method as set forth in claim 1 wherein the step of operating is performed by inputting the information into the controller via a keypad having a plurality of keys, and wherein in response to the inputted information the alerting indicator level is reduced by a predetermined amount for each depression of at least one of the plurality of keys.

6. A method for decreasing the level of a user-perceptible alerting indicator of a radiotelephone, comprising the steps of:
   receiving, at the radiotelephone, a signal indicating an incoming call;
   in response to the radiotelephone receiving the signal indicating the incoming call, generating the alerting indicator to notify a user of the incoming call;
   operating a user interface for inputting information to a controller of the radiotelephone, the information specifying that the level of the alerting indicator be reduced; and
   in response to the inputted information, variably reducing the level of the alerting indicator while the incoming call is being received by the radiotelephone, wherein the alerting indicator level is increased upon the elapse of a predetermined time period from when the incoming call is first received.

7. A method for decreasing the level of a user-perceptible alerting indicator of a radiotelephone, comprising the steps of:
   receiving, at the radiotelephone, a signal indicating an incoming call;
   in response to the radiotelephone receiving the signal indicating the incoming call, generating the alerting indicator to notify a user of the incoming call;
   operating a user interface for inputting information to a controller of the radiotelephone, the information specifying that the level of the alerting indicator be reduced; and
   in response to the inputted information, variably reducing the level of the alerting indicator while the incoming call is being received by the radiotelephone, wherein the alerting indicator level is increased automatically when the incoming call is responded to by the user.

8. A method as set forth in claim 1 wherein the alerting indicator includes at least one of a vibration, an audible tone, and a visual indicator.

9. A method as set forth in claim 1 further comprising the steps of:
   operating the user interface for inputting information to the controller of the radiotelephone, the information specifying that the alerting indicator level be increased; and
   in response to the inputted information specifying that the alerting indicator level be increased, increasing the alerting indicator level.

10. A method as set forth in claim 1 further comprising steps of:
    maintaining the alerting indicator at a reduced level for subsequent incoming calls until information is input to the controller via operation of the user interface, which information specifies that the alerting indicator level be increased; and
    in response to the inputted information specifying that the alerting indicator level be increased, increasing the alerting indicator level.

11. A radiotelephone, comprising:
    a receiver for receiving an incoming call signal and for outputting a first signal in response to receiving the incoming call signal, the first signal indicating that an incoming call is being received by the radiotelephone;
    a controller having an input coupled to an output of said receiver, said controller for outputting a second signal in response to receiving the first signal at said input;
    audio circuit means having an input coupled to an output of said controller, said audio circuit means being responsive to said second signal for generating an audible alerting indicator to notify a user of said incoming call, wherein a volume of said audible alerting indicator is variable under the control of said controller; and
    a user interface including a plurality of keys for inputting information to said controller specifying that the volume of said alerting indicator be variably reduced;
    wherein said controller is responsive to the inputted information for signalling said audio circuit means to reduce the alerting indicator volume in accordance with said inputted information during a time when said alerting indicator is being generated indicating that said incoming call is being received by the radiotelephone.

12. A radiotelephone as set forth in claim 11 wherein said controller is responsive to the inputted information for signalling said audio circuit means to variable reduce the alerting indicator volume by an amount that is a function of an amount of time that at least one of the plurality of keys is depressed.

13. A radiotelephone as set forth in claim 11 wherein said controller is responsive to the inputted information for signalling said audio circuit means to variable reduce the alerting indicator volume by a predetermined amount for each depression of at least one of the plurality of keys.

14. A radiotelephone, comprising:
    a receiver for receiving an incoming call signal and for outputting a first signal in response to receiving the incoming call signal, the first signal indicating that an incoming call is being received by the radiotelephone;
    a controller having an input coupled to an output of said receiver, said controller for outputting a second signal in response to receiving the first signal at said input;
    audio circuit means having an input coupled to an output of said controller, said audio circuit means being responsive to said second signal for generating an audible alerting indicator to notify a user of said incoming call, wherein a volume of said audible alerting indicator is variable under the control of said controller; and
    a user interface including a plurality of keys for inputting information to said controller specifying that the volume of said alerting indicator be variably reduced;

wherein said controller is responsive to the inputted information for signalling said audio circuit means to reduce the alerting indicator volume in accordance with said inputted information during a time when said alerting indicator is being generated indicating that said incoming call is being received by the radiotelephone, wherein said controller further comprises timing means having an associated predetermined timeout value, said timing means for measuring the time elapsed from when said controller first receives said first signal indicating that an incoming call is being received by the radiotelephone, and wherein said controller signals said audio circuit means to increase the alerting indicator volume upon the controller determining that the measured elapsed time equals said predetermined timeout value.

15. A radiotelephone, comprising:

a receiver for receiving an incoming call signal and for outputting a first signal in response to receiving the incoming call signal, the first signal indicating that an incoming call is being received by the radiotelephone;

a controller having an input coupled to an output of said receiver, said controller for outputting a second signal in response to receiving the first signal at said input;

audio circuit means having an input coupled to an output of said controller, said audio circuit means being responsive to said second signal for generating an audible alerting indicator to notify a user of said incoming call, wherein a volume of said audible alerting indicator is variable under the control of said controller; and a user interface including a plurality of keys for inputting information to said controller specifying that the volume of said alerting indicator be variably reduced;

wherein said controller is responsive to the inputted information for signalling said audio circuit means to reduce the alerting indicator volume in accordance with said inputted information during a time when said alerting indicator is being generated indicating that said incoming call is being received by the radiotelephone, and wherein said controller is responsive to a call being terminated for signalling said audio circuit means to increase the alerting indicator volume.

16. A radiotelephone as set forth in claim 11, wherein said user interface is also for inputting, into said controller, information specifying that the volume of said alerting indicator be increased, and wherein said controller is also responsive to this inputted information for signalling said audio circuit means to increase the alerting indicator volume to an original volume.

* * * * *